Q. SANTICOLA.
SALAD DRESSING CONTAINER.
APPLICATION FILED JAN. 20, 1914.
1,147,554.
Patented July 20, 1915.
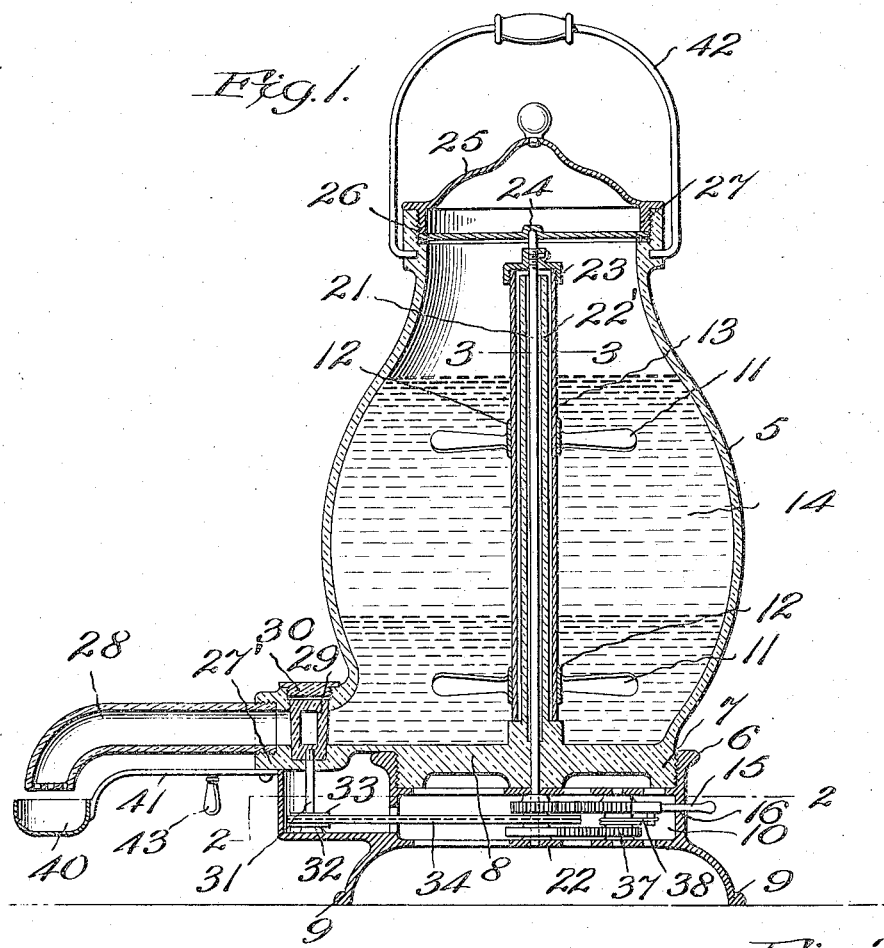
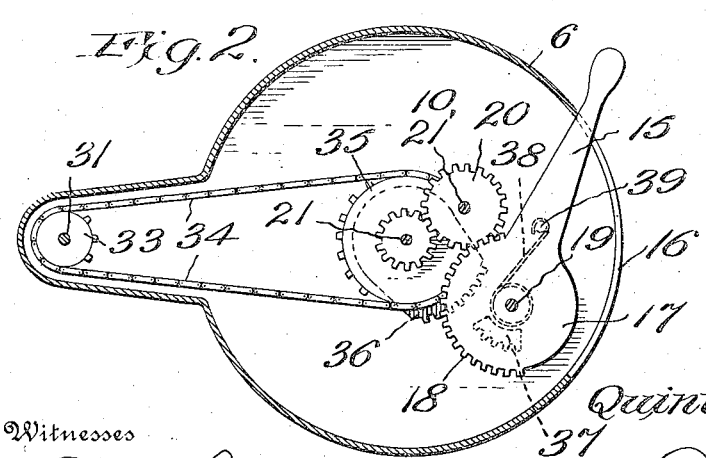
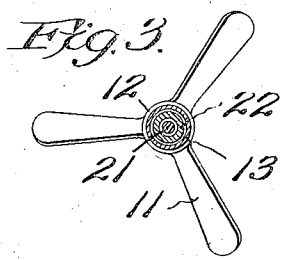
Witnesses
C. James Cronin
M. E. Laughlin
Inventor
Quintino Santicola,
By Geo. H. Byrne
Attorney

UNITED STATES PATENT OFFICE.

QUINTINO SANTICOLA, OF NEW YORK, N. Y.

SALAD-DRESSING CONTAINER.

1,147,554.     Specification of Letters Patent.     Patented July 20, 1915.

Application filed January 20, 1914. Serial No. 813,304.

*To all whom it may concern:*

Be it known that I, QUINTINO SANTICOLA, a subject of the King of Italy, residing at New York city, State of New York, have invented new and useful Improvements in Salad-Dressing Containers, of which the following is a specification.

The general object of the invention is to admit of maintaining prepared quantities of salad dressing in a sanitary condition for an indefinite period and to facilitate the operation of agitating this substance so that the ingredients thereof will be properly combined whenever it is desired to use a portion of the prepared quantity. And to this end the invention resides in providing an air-tight receptacle for the dressing and disposing in the interior of this receptacle agitators, providing means for operating the agitators and in disposing this operating means exteriorly of the receptacle.

Other objects will appear and be better understood from that embodiment of my invention of which the following is a specification, reference being had to the accompanying drawings forming part thereof.

Figure 1 is a vertical longitudinal section of the invention. Fig. 2 is a horizontal section on the line 2—2 of Fig. 1. Fig. 3 is a detail horizontal section on the line 3—3 of Fig. 1.

The receptacle is indicated by 5. This element may be formed of any material found suitable for the purpose and of any suitable design. In the present instance, the said receptacle is shown as formed of glass and has a shape conforming to that of an urn. The support for the receptacle 5 may form a part thereof or be suitably connected thereto as shown in the drawings, where it will be observed the said support comprises a cylindrical casing 6 the upper portion of which is interiorly screw-threaded to receive a boss 7 forming part of the bottom 8 of the receptacle and exteriorly screw-threaded and screwed into the casing 6.

9 indicates supporting legs which may be of any fanciful design or contour and preferably formed integral with the casing 6 so as to support the same in an elevated position, as shown.

The casing 6 is formed with a chamber 10 for the mechanism which operates the agitators hereinafter to be described, and the valve which controls the outlet of the receptacle.

The agitating mechanism is such as will effect the co-mingling of the ingredients of the salad dressing or other substance within the casing upon the operation of the mechanism contained in the casing 6. In the present instance this agitator is shown to consist of a plurality of blades, preferably two, herein indicated by 11—11 and mounted on hubs 12—12 which are fixedly secured to a tubular shaft 13. The upper set of blades upon being rotated, move the liquid substance 14 in a downwardly direction, while the lower set of blades are arranged so as to move the substance 14 in an upward direction when rotated. Thus it will be seen that by one set of blades forcing the substance 14 in a direction opposed to that in which the substance is forced by the other set, the result will be a co-mingling of the heavier ingredients of the substance precipitated in the lower part of the receptacle with the lighter ingredients situated on and near the surface of the column of substance 14.

The mechanism contained in the casing 10 for operating the agitator, may be of any approved or desired construction. In the present embodiment this mechanism is shown to include an operating lever 15 which extends through a lateral horizontally disposed slot 16 in the casing 6. The inner end of this lever is formed with a substantially circular enlargement 17, a portion of which is provided with gear teeth 18. The said lever is rotatably mounted on a spindle 19 and the teeth thereof mesh with the teeth of an idler gear 20 which is fastened to a shaft 21', the lower end of which is arranged in the bottom 22 of the casing 6 and the idler gear 20 in turn meshes with the teeth of a small gear on the spindle 21 connected with the agitator. The shaft 21 extends vertically and through a tubular extension 22' herein shown as formed integral with the bottom of the receptacle and extending for a suitable distance upwardly through the receptacle and preferably to a point beyond the surface of the contents of the receptacle. The upper end of the shaft 21 projects beyond the tubular extension 22' and is suitably fastened to the tubular shaft 13 as with a bonnet 23, which is screwed onto the projecting end portion of the shaft 21 and onto the upper end of the tubular shaft 13. The upper end of the shaft 21 is stepped in a bearing 24 and by preference this bearing is formed in a cover 25. The said cover 25 provides a closure for the receptacle 5 and by preference the upper end portion of the latter is counter-bored and interiorly screw-threaded as indicated at 26, to accommodate a screw-threaded portion 27 on the cover 25.

The lower portion of the receptacle 5 is provided with a laterally extending tubular extension 27' which by preference is interiorly screw-threaded for a portion of its length, to receive the inner end of a screw-threaded nozzle or spout 28. The extension 27' is adapted for receiving a rotatable valve 29 which functions to control the passage through the extension 27' and the spout 28. As shown, the lower end of the valve is seated in a depression in the lower side of the extension 27', and a plug or cap 30 is provided for retaining the valve in its seat.

31 indicates a stem connected to the lower end of the valve 29 and operating to turn the valve. The lower end of this stem is stepped in a bearing 32 in the bottom of the casing 6 and mounted on the stem is a sprocket 33 which is connected by a sprocket chain 34 to a sprocket wheel 35 mounted on the shaft 21 and located in the casing 6. It may here be stated that the sprocket 35 is loose upon the shaft 21, but has formed therewith and preferably located on its lower surface a toothed quadrant 36 which projects beyond the periphery of the sprocket. This quadrant 36 coöperates with a toothed quadrant 37 formed with the circular head 17 of the operating lever 15, but the relative positions of the quadrants 36 and 37 are such that these will not engage one with the other until the operating lever is moved to a point adjacent to the end of one of its extreme positions.

In their normal positions the parts are arranged as shown in Figs. 1 and 2. Here it will be observed that the operating lever 15 is at one end of the slot 16 and is yieldingly held in this position by the presence of a spring 38 which is herein shown as connected to a stud 39 on the lever and to the shaft 19. When the parts are so positioned the toothed quadrant 37 will be farthest removed from the toothed quadrant 36 so that the operating lever 15 may be moved for a comparatively considerable distance before effecting engagement between the quadrants 36 and 37. Now when the parts are so arranged and it is desired to co-mingle the components of the substance 14, which as will be readily understood, will be largely separated if this substance be salad dressing and formed with solids and oil, the operator moves the lever 15 for a distance substantially equal to one-half the length of the slots. This action on the part of the lever has the effect of rotating the agitator and producing the result heretofore stated. In the event of its being necessary to operate the lever several times before effecting a proper co-mingling of the substance 14, the spring 36 which is tensioned each time the lever is moved toward the observer as viewed in Fig. 2, will restore the lever to its original position upon release, this will, of course, operate the blade to turn in a reverse direction and effect a further agitation of the substance 14. When the operator has determined that the ingredients of the substance 14 have been properly co-mingled the lever 15 is moved throughout the length of the slot 16 and in so moving effects connection between the quadrants 36 and 37, whereupon the sprocket wheel 35 is turned and the valve 29 opened by virtue of the chain connection between the sprocket wheel 33 and the stem 31 of the said valve and the sprocket wheel 35. With the valve opened the liquid substance 14 flows through the nozzle or spout 28 and into a receptacle positioned below the spout. This action on the part of the substance 14 will continue as long as the valve 29 remains open. When the operator releases the handle 15 the spring will restore the valve to its closed position at which time a drip cup 40 carried by an arm 41 which is pivoted at one end to the lower part of the extension 27, is swung to a position below the nozzle 28 so as to receive the substance contained in the nozzle after the closing of the valve 29.

A bail or handle 42 is attached to the upper end of the receptacle 5 and an operating handle 43 is attached to the arm 41 which carries the drip cup. The presence of the arm 42 facilitates the carrying of the container from place to place and the lifting of it onto a table or the like, while the handle 43 provides a convenient handhold when it is desired to swing the drip cup away from or to a position underneath the nozzle.

What is claimed as new is:

1. In combination, a receptacle provided with an outlet opening, an agitator located in the receptacle, a valve for controlling passage through the outlet opening, and mechanism arranged to oscillate the agitator and to intermittently oscillate the valve subsequent to the initial oscillation of the agitator, said mechanism adapted to be manually actuated in one direction and to be spring actuated in the opposite direction.

2. In combination, a casing, a receptacle mounted on the casing and having an outlet opening, a valve for controlling passage through the outlet opening, an agitator located in the receptacle, operating mechanism located in the casing and connected to the valve and to the agitator and adapted for operating the agitator and for intermittently operating the valve subsequent to the initial operation of the agitator, said mechanism adapted to be manually actuated in one direction and to be spring actuated in the opposite direction.

3. In combination, a casing, a receptacle mounted on the casing and having an outlet opening, a turnable valve for controlling passage through the outlet opening, an agitator located in the receptacle, operating mechanism located in the casing and connected to the valve and to the agitator and adapted for operating the agitator and for turning the valve subsequent to the initial movement of the agitator and a spring actuated lever for operating the mechanism.

4. In combination, a casing, a receptacle mounted on the casing and having an outlet opening, a valve for controlling passage through the outlet opening, an agitator vertically arranged in the receptacle, operating mechanism including a spring actuated train of gears located in the casing and connected to the valve and to the agitator and adapted for operating the agitator and for intermittently operating the valve subsequent to the initial movement of the agitator.

5. In combination, a casing, a receptacle mounted on the casing and having an outlet opening, a valve for controlling passage through the outlet opening, an agitator located in the receptacle, operating mechanism including a train of gears located in the casing and connected to the valve and to the agitator and adapted for operating the agitator and for intermittently operating the valve subsequent to the initial movement of the agitator and a spring actuated lever horizontally arranged in the casing for operating the mechanism.

In testimony whereof, I have signed my name to this specification in the presence of two subscribing witnesses, this fourteenth day of January, 1914.

QUINTINO SANTICOLA.

Witnesses:
    JOHN A. DONEGAN,
    H. H. BYRNE.